Figure 1:
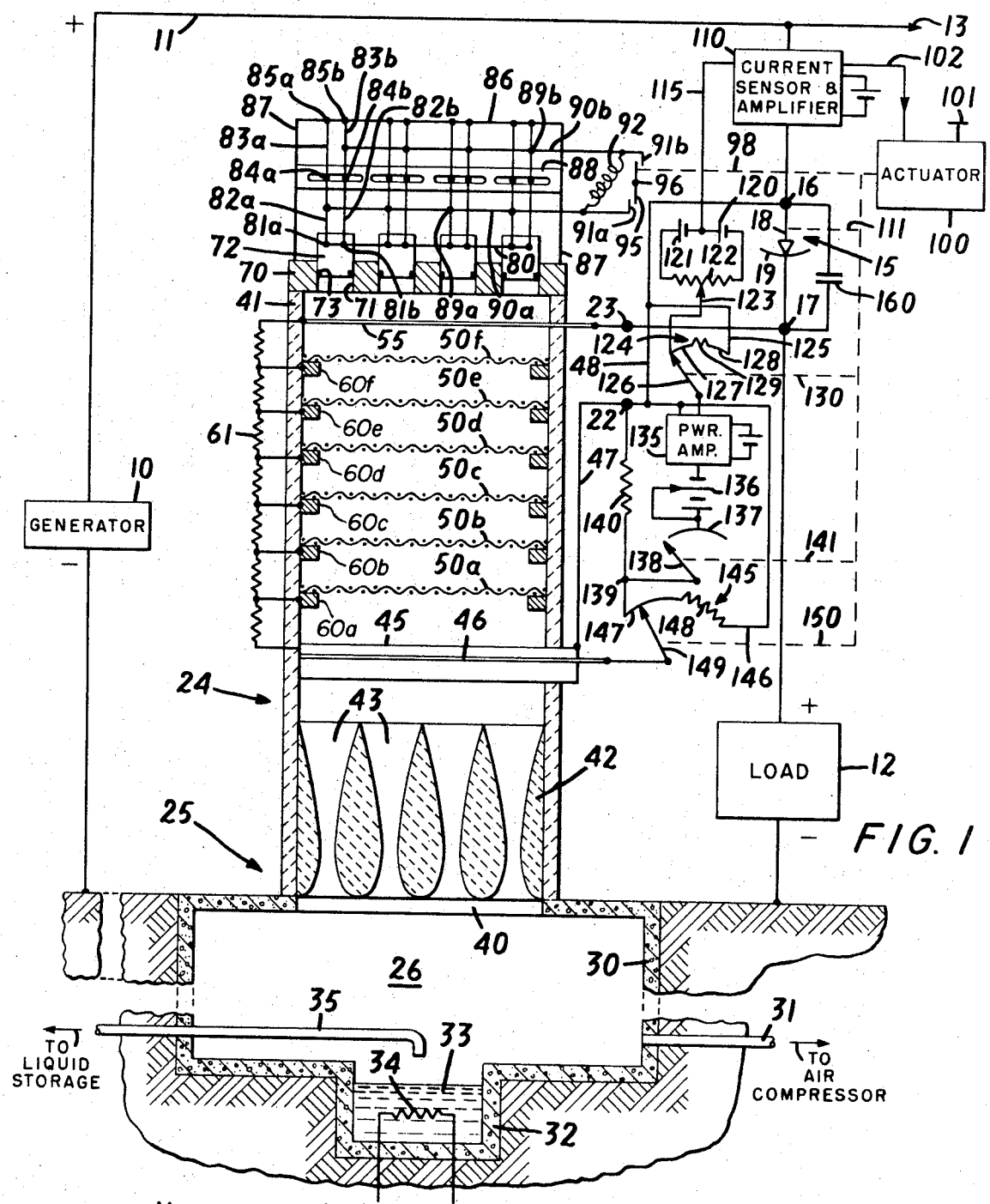

United States Patent

[11] 3,562,585

| [72] | Inventor | Meredith C. Gourdine |
| | | West Orange, N.J. |
| [21] | Appl. No. | 756,220 |
| [22] | Filed | Aug. 29, 1968 |
| [45] | Patented | Feb. 9, 1971 |
| [73] | Assignee | Gourdine Systems, Incorporated |
| | | Livingston, N.J. |
| | | a corporation of Delaware |

[54] ELECTROGAS-DYNAMIC SYSTEMS ADAPTED FOR CIRCUIT BREAKING AND OTHER PURPOSES
17 Claims, 2 Drawing Figs.

| [52] | U.S. Cl. | 317/11, 307/136 |
| [51] | Int. Cl. | H02h 7/22 |
| [50] | Field of Search | 317/11; 307/133, 136 |

[56] References Cited

UNITED STATES PATENTS

| 1,338,334 | 4/1920 | Slepian | 317/11 |
| 1,650,909 | 11/1927 | Rudenberg | 317/11 |
| 2,789,253 | 4/1957 | Vang | 317/11 |

*Primary Examiner*—James D. Trammell
*Attorney*—Brumbaugh, Graves, Donohue & Raymond

ABSTRACT: An electrogasdynamic tube is coupled in parallel with a switch for interrupting high voltage direct current. In course of opening the switch, a flow of ionized fluid in the tube conducts current to prevent arcing across the switch contact or to suppress an arc if it develops.

INVENTOR.
MEREDITH C. GOURDINE
BY Brumbaugh Graves
Donohue & Raymond
his ATTORNEYS 3,562,585

ELECTROGAS-DYNAMIC SYSTEMS ADAPTED FOR CIRCUIT BREAKING AND OTHER PURPOSES

This invention relates to electrogasdynamic systems, apparatus and methods which are capable of diverse applications, but which are particularly described herein in relation to the practical application of implementing the interruption of high voltage direct current As present, the transmission of electric power over long distances is mostly accomplished by the conversion of the power into high voltage alternating current which flows from a generating station to a receiving point over high voltage transmission lines. The interruption of such high voltage power is effected by circuit breakers which take advantage of the cyclical reduction of the alternating voltage to zero value to suppress arcing developed in the course of opening the circuit breaker.

Transmission losses can be reduced if the power is transmitted over the lines in the form of high voltage direct current instead of a high voltage alternating current. The present trend in the electrical utility industry is, therefore, to use the direct current mode of transmission, the voltage employed being from 500 to 1,000 kilovolts, and the current from 100 to 1,000 amperes.

In high voltage direct current power however, the feature of the intermittent passage of the voltage through zero (which made it relatively easy to extinguish arcing in the circuit breakers for interrupting high voltage alternating current) is absent. Being unable to rely on that feature, the prior art has so far been frustrated in its efforts to arrive at practical solutions to the problem of high voltage DC interruption.

An object of this invention is to provide means and methods for overcoming such problem.

Another object of the invention is to provide improvements in electrogasdynamic systems adapted for implementing interruption of high voltage direct current or for other purposes.

Still another object to the invention is to provide new and useful modes of operation of electrogasdynamic systems.

These and other objects are realized in accordance with the invention by developing a flow of current in electrogasdynamic channel means, coupling the terminals of such channel means to external circuit means, and controlling said flow of current in said channel means so as to have a desired effect on current flowing through said circuit means.

As an aspect of the invention, such circuit means may be circuit breaking switch means for interrupting high voltage DC current, and the flow of current through the channel means is controlled so as to at least transiently reduce to practical zero value the current passing through the switch means in the course of an opening thereof.

As another aspect of the invention, the flow of current through the electrogasdynamic channel means may be under the control of sensing means responsive to current through the circuit means to adjust the operation of the channel means so as to tend to maintain the last named current at a selected value which may be zero.

Other aspects of the invention relate to a valve means for electrogasdynamic channel means, space charge field reducing means disposed in electrogasdynamic channel means to permit increased ion density in the fluid flowing therein, and improved means for supplying ionized fluid to an electrogasdynamic channel means.

Still other aspects of the invention relate to methods for operating electrogasdynamic channel means so as to cause such means to act in circuit as a current conductor which, electrically speaking, is substantially lossless.

Figure 2:
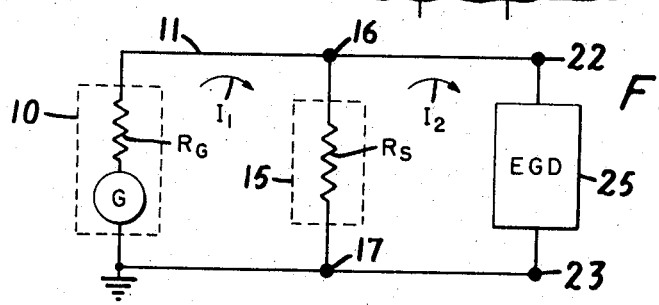

For a better understanding of how these and other objects of the invention are realized, reference is made to the following description of an exemplary embodiment thereof, and to the accompanying drawings wherein:

FIG. 1 is a schematic diagram of an exemplary high voltage DC circuit breaking system embodying the invention; and FIG. 2 is a circuit diagram explanatory of the operation of the system of FIG. 1.

For a better background understanding of the electrogasdynamic aspect of the invention hereof, reference is made to my U.S. Pat. Ser. No. 3,449,667, entitled "Electrogasdynamic Method and Apparatus for Detecting the Properties of Particulate Matter Entrained in Gases," issued Jun. 10, 1969, my copending application Ser No 436,892, entitled "Electrogasdynamic Systems," filed Mar. 3, 1965; and my abandoned applications, Ser No. 389,360, entitled "Electrogasdynamic Systems," filed Aug. 13, 1964; Ser. No. 601,270, entitled "Electrogasdynamic Systems and Methods," filed Nov. 15, 1966; and Ser. No. 655,977, entitled "Precipitator Systems," filed Jun. 16, 1967.

Referring now to FIG. 1, the reference numeral 10 designates generator means of high voltage direct current. The generator 10 is coupled between ground and a transmission line 11 supplying such current to a load 12 remote from source 10 and connected between line 11 and ground. Load 12 may be the whole load on source 10. Alternatively, that load may be one of several loads connected in parallel between line 11 and ground, the other loads being coupled to an extension of line 11 not shown in the drawing but indicated therein by arrow 13.

The flow of current through load 12 may be selectively interrupted by DC circuit breaker equipment represented in FIG. 1 by a main switch 15 between line 11 and load 12 and comprised of first and second terminals 16 and 17 and first and second contacts 18 and 19 coupled to, respectively, those first and second terminals. As indicated, contact 18 is a movable contact whereas contact 19 is fixed. Those two contacts are normally closed and the engagement between them is of such character that contact 18 may move for a distance relative to contact 19 before the engagement is broken and a gap is opened between the two contacts.

Terminals 16 and 17 of switch 15 are coupled to, respectively, an output terminal 22 and an output terminal 23 for a tube 24 forming the electrically active section of an electrogasolynamic installation 25 also comprised of a section 26 for storing ionizable fluid. That installation will now be described in detail.

Container section 26 is comprised of a cylindrical shell 30 which is sunk into the earth and is formed of concrete reinforced in a well known manner to retain gas therein at a pressure on the order of 1500 p.s.i. That gas is preferable compressed air supplied from an air compressor (not shown) to the container by an air line 31.

In the bottom of the container is formed a reservoir or well 32 for holding a supply of a liquid 33 which is, say, water or alcohol, and which has a substantial expanse of surface exposed to the gas in the container such that the liquid vaporizes into the gas. To implement such vaporization and to assure a suitably high pressure of vapor in the admixed gas-vapor fluid in the container, the liquid 33 is heated in well 32 by an electric heater 34. The supply of liquid in the well may be replenished through a pipe 35.

At this point, it is noted that the fluid supply means of installation 25 need not be of the sort just described. Instead, the operating fluid for the installation may be supplied by, say, liquid or solid rockets or smoke bombs. Moreover, the gaseous component of the fluid employed need not be air but may instead be, say, pure nitrogen or freon. Further, materials other than water or alcohol may be used for seeding the fluid.

Container section 26 is coupled by a valveless passage way 40 to the upstream end or bottom of tube 24. That tube is comprised of an elongated dielectric cylinder 41 which is reinforced in a well known manner to withstand the pressure in the tube, and which is definitive of a wall-bounded vertical flow path for the fluid supplied from container 26.

Within the bottom portion of cylinder 21 is a dielectric plug 42 having formed therein a two-dimensional array of nozzles 43 for accelerating to supersonic a flow of fluid entering the tube 24 from container 26. In the course of such acceleration, the vapor in the fluid condenses to form minute particles or droplets entrained in a still-gaseous surrounding medium. The resulting seeded fluid then passes to ionizing electrode means comprised of an array of parallel horizontal attractor electrode bars 45 spaced from each other normal to the plane of the drawing and, also, of an array of horizontal corona electrode wires 46 parallel to bars 45 and disposed such that each of those wires is equidistantly spaced between two adjacent ones of the bars 45. In order to minimize fluid flow losses in tube 24, the bars 45 may be of streamlined cross-sectional configuration in the set of vertical planes which pass normally through those bars.

The attractor electrode means comprised of all of bars 45 is coupled through lead 47 to terminal 22 and, from thence, through lead 48 to the terminal 16 of main switch 15. The corona electrode means comprised of all of the wires 46 is coupled through lead 46 to circuits (later described in more detail) imparting to those wires a positive voltage relative to bars 45. That voltage creates between each of wires 46 and the adjacent bars 45 an ionizing electric field causing the generation of positive ions in the fluid passing upwardly between the bars and the wires.

Upon so being ionized, the fluid passes through a succession of electrodes 50a—50f comprised of insulated electroconductive wires. Then the fluid flows through an array of parallel horizontal collector wires 55 spaced from each other in the direction normal to the plane of the drawing. The collector electrode means formed of all of wires 55 is coupled by lead 56 to the terminal 17 of the main switch 15. In operation, the collector wires 55 serve in a well known manner to neutralize the ions carried to those wires by the supersonically flowing fluid. The combined effect of the production of positive ions by the ionizing electrodes 45 and 46 and the neutralization of such ions by the collector electrodes 55 is to create in the electrogasdynamic tube 24 a flow of positive current from the electrodes 45, 46 to the electrodes 55.

To consider further the electrodes 50a—50f, each of those electrodes is in the form of a gridwork comprised of a first set of spaced generally parallel electroconductive (e.g., metal) wires and a second set of spaced, generally parallel electroconductive wires which are generally orthogonal to and interwoven with the wires of the first set. Each of the wires in each gridwork is enclosed by a sheath of dielectric material which may be formed either by applying a dielectric coating to the wire or by oxidizing, nitriding or otherwise chemically treating the metal thereof. Each gridwork is circumferentially circular and is supported by an electrically coupled to a respectively corresponding one of a plurality of metal rings 60a—60 mounted in axially spaced relation on the inner wall of the dielectric cylinder 41. The rings 60a—60f are, in turn electrically connected to corresponding tap points on a high resistance voltage divider network 61 coupled between the attractor electrodes 45 and the collector electrodes 55.

During the flow of the ionized fluid through the tube 24, the positive space charge provided by the ions will induce the flow of negative charges into the dielectrically coated wires of gridworks 50a—50f from the circuits external to those gridworks. The negative charges so developed on the surface of the metal of those wires serve as image charges for the positive ion space charge so as to cause the electric field lines from that space charge to terminate on the metal of such wires rather than to continue outward through the tube 24. Hence, each gridwork serves, in effect, to subdivide the field derived from the ion-produced space charge in the whole interior cross section of the tube into a plurality of smaller space charge fields derived from separate space charge areas of which each corresponds to one of the interstitial spaces of the gridwork. To put it another way, the gridworks in tube 24 serve, in effect, to subdivide the space in that tube into a plurality of parallel lengthwise-running flow channels which are each of relatively small cross-sectional dimensions, and which are each electrostatically shielded from each other.

The ability of the gridworks to provide the described subdividing effect is one which improves with progressive decrease in the value of the ratio L/D where L is the spacing between two adjacent gridworks and D is the inner diameter of tube 24. Hence, the EGD installation should be constructed so that L/D has a value of less than 1.0 and (by employing many gridworks per unit length of tube) is preferably as small as practical consonant with obtaining reasonable aerodynamic efficiency of flow.

To explain further the advantage provided by the described gridworks, it is desirable to maximize the ion density in tube 24 because to do so permits a given amount of current to be produced in the tube by a mass rate of flow of fluid which is minimized and can thereby be produced by an electrogasdynamic installation of which the size has been correspondingly minimized.

The value, however, to which the ion density can be increased has a practical upper limit set by the fact that the ion density cannot be so great as to produce at the wall of the tube 24 a radial space charge field of a strength causing breakdown of the dielectric material in the wall. The relation between such radial field strength and the ion density is that the field strength varies directly with the product of the ion density and the cross-sectional area of the space charge producing the radial space charge field. It follows that, if the radial field at the tube wall is derived from a space charge area occupying the whole inside cross section of the tube, then the ion density in that area must be kept relatively low to prevent breakdown of the wall by the field. If, however, as caused by the gridworks, the radial space charge field is derived only from an area of space charge of a size of about one of the interstices of the gridworks, the ion density can be made relatively great before the strength of the radial field approaches the critical value at which breakdown of the dielectric wall will occur.

Hence, the gridworks 50a—50f of the FIG. 1 EGD installation are beneficial in that they permit the ionized fluid in tube 24 to have a high ion density to thereby permit a desired amount of ion-carried current to be created by a mass rate of flow of fluid which is relatively small and, therefore, can be sustained by an EGD installation of correspondingly small size.

Returning now to the structure of the installation, the flow of fluid out of the upper end of tube 24 is normally prevented by a valve means comprised of a plate 70 which forms a closure wall across the top of the interior of the tube, and which has formed therein an orthogonal row-and-column array of cylindrical ports 71 extending axially through the plate 70. Those ports have normally seated therein the bottom portions of a corresponding plurality of slidably received pistons 72 of which the tops project above plate 70. Each piston has mounted thereon an O-ring or other type seal 73 encircling the piston and engaging the inner wall of the corresponding port to prevent upward leakage of fluid through the clearance between the port wall and the piston. Hence, under normal conditions, each of the ports 71 is closed fluidtight by the piston therein.

From what has been said, it will be evident that, when the EGD installation is not in operation, fluid from the container 26 diffuses freely through the valveless opening 40 into the interior of tube 41 so as to cause equalization of the pressure of the fluid in the tube and in the container.

To induce a flow of fluid through the tube, the described valve means is opened by upward displacement of the pistons out of ports 71 to positions at which the piston bottoms are well above plate 70 so as to permit free escape of the fluid through the ports. That piston displacement is initiated by a latching-type linkage system which will now be described.

The system just mentioned is comprised of bars or like rigid members mostly represented schematically in FIG. 1 by heavy solid lines and, also, of hinge or pivot pins represented schematically in FIG. 1 by heavy solid dots. In the system, the pistons 72 in each row thereof are joined together by two parallel horizontal bars 80 passing by each piston on opposite sides thereof and coupled to each piston by a pair of pivot pins 81a—81 spaced from each other along the center lines of bars 80 and each passing through the top of the piston and through both bars in a direction normal to the plane of the drawing. Each pin 81a also passes on each side of the corresponding piston through the bottom end of a lower link 82a of a leftword-breaking toggle joint also comprised of an upper link 83a pivotally joined to the lower link by a center pin 84a. In like manner, each pin 81b passes on each side of the corresponding piston through the bottom end of a lower link 82b of a rightward-breaking toggle joint also comprised of a upper link 83b pivotally joined to the lower link 82b by a center pin 84b.

The upper ends of the upper links of the leftward and rightward breaking toggle joints for each row of pistons are coupled through pins 85a and 85b, respectively, to a horizontal load-bearing cross head bar 86 rigidly coupled at its opposite ends to plate 70 through vertical tiebars 87. The center pins 84a, 84b of all such toggle joints ride in horizontal slots in a horizontal guidebar 88 mounted at its opposite ends in vertical ways provided by the tiebars 87 and permitting upward self-parallel movement of the guidebar. The lower links 82a of all the leftward breaking toggle joints for a given row of pistons are coupled by pins 89a to a horizontal unlatching bar 90a extending rightwardly of plate 70 to terminate in an upwardly projecting lug 91a. Similarly, the upper links of all the rightwardly breaking toggle joints for that row of pistons are coupled by pins 89b to a horizontal unlatching bar 90b extending rightward of plate 70 to terminate in a downwardly projecting lug 91b. The unlatching bars 90a and 90b are normally biased rightwardly and leftwardly, respectively, by a tension spring 92 connected as shown between those bars.

Disposed between bars 90a and 90b at the rightward ends thereof is a generally vertical hammer bar 95 rotatable about a pivot pin 96 centrally positioned in the length of the bar. As shown, the upper end of bar 95 is to the left of and adjacent to lug 91b, while the lower end of bar 95 is to the right of and adjacent to the lug 91a. The hammer bar 95 is rotatable clockwise about its pin 96 by a connection of the bar to a motion transmitting linkage indicated by dash line 98 and movable rightwardly by a selectively triggerable actuator device 100. That device may be, for example, a valve-controlled pneumatic cylinder and piston of which the piston is coupled to linkage 98 to move it rightward when air is injected behind the piston in response to triggering of the valve of the device either by manual pressing of an air control button 101 or by the receipt on lead 102 of a trigger signal developed as later described. The rightward movement of the actuator also serves through motion transmitting linkage 111 to open the main switch 15.

The linkage system operates as follows:

As long as the unlatching bars 90a, 90b are respectively maintained full rightward and full leftward at their shown piston latching positions which can be established by stops (not shown), the lower and upper links of each toggle joint will be in vertical alignment. Under that condition, the force exerted on each piston 72 by the pressure of the fluid in tube 41 will be wholly transmitted through the toggle joints for that piston to the load bearing bar 86 coupled to those joints. When, however, device 100 is actuated to move linkage 98 rightward to rotate hammer bar 95 clockwise, the upper and lower ends of the hammer bar 95 strike the lugs 91b and 91a, respectively, to displace the bars 90b and 90a rightward and leftward, respectively, so as to initiate scissoring of both the rightward breaking and leftward breaking toggle joints. As soon, however, as such joints start to scissor, they are incapable of transmitting force and exert practically no resistance to upward motion of the pistons 72. Hence, the scissoring of the toggle joints is completed by a driving (by the fluid pressure) of the pistons 72 all the way out of ports 71, such piston driving being accompanied by a further displacement of bars 90b and 90a rightward and leftward, respectively. The opening of the ports is thus accomplished for the most part by the energy provided by the fluid which is to pass through such ports. Once, of course, that the pistons 72 have been blown out of their ports, the fluid escapes freely through those ports from the tube 24 to permit a supersonic flow of such fluid through that tube.

Because of the geometry of the linkage system connected to the pistons 72, each piston is constrained to move only in a self-parallel manner coaxial with the axis of the corresponding port. It follows that the pistons may be returned into their ports and latched in place by simply giving the bars 90a and 90b respective movements which are the reverse of those undergone by such bars in the course of opening of the ports. Those movements will be aided by the tension of the spring 92. In order, however, to positively close the ports and to latch the pistons, such reverse movements are primarily effected by, say, manually controlled pneumatic pusher rams (not shown) disposed in relation to, respectively, the bars 90a and 90b to offer no or little resistance to the opening movements of those bars but adapted when actuated to drive those bars reversely so as to restore them to their positions shown in FIG. 1.

In the FIG. 1 equipment, the actuator device 100 forms one component of a control means or system of which the other components will now be described.

The path for current through load 12 and switch 15 also includes a current responsive unit 110 coupled between the high voltage line and the switch terminal 16. Unit 110 is comprised of circuits for sensing the amount of current flowing through switch 15 and for developing two signals as functions of that current. One of such signals is the mentioned trigger signal which is produced on lead 102 whenever the switch current exceeds a selected threshold value. The other signal is an error signal developed on output lead 115 to provide a closed loop type control for the current flowing through the EGD tube 24. Such error signal appears on lead 115 as a variable voltage relative to terminal 16, and the error signal is formed by electrically deriving and amplifying an original signal proportional to the switch current and electrically integrating that amplified signal by short time constant integrator means. The purpose of the electrical integration is to stabilize the closed loop mode of control against excessive electrical hunting.

Lead 115 is connected to the junction of the positive and negative terminals of, respectively, two floating voltage supplies 120 and 121 coupled in series in a circuit completed by a resistive potentiometer winding 122 on which is slidable a wiper 123. Elements 120—123 permit the addition to the variable error signal voltage of a bias voltage which is selectable in amplitude and polarity by adjustment of the tap 123 over the winding 122.

A control signal formed of the variable voltage and the said bias voltage is supplied from tap 123 to the lefthand end of an arcuate fixed contact 124 of which the other end is coupled by lead 125 to the terminal 16. Contact 124 is divided into lefthand and right-hand highly conductive end sections 127 and 128 and into a high resistance central section 129 inserted between those two conductive sections. A movable contact 126 is adapted to be moved from left to right over the arcuate contact 124 by a motion transmission linkage 130 driven by the actuator 100.

Movable contact 126 is coupled to one input of a power amplifier 135 of which the other input is indirectly coupled to terminal 16. The output of amplifier 135 is coupled in series with a power supply 136 providing a constant (but adjustable) power output and with an arcuate fixed contact 137 adapted to be either in opened or closed relation with a movable contact 138. The contact 138 is electrically coupled through junction 139 and high resistance 140 with the terminal 16. The last-named contact is normally disposed opened (as shown) with contact 137 but can be closed with and slid over the contact 137 by the action of a motion transmitting linkage 141 moved by the actuator 100.

The junction 139 is coupled to the left-hand end of an arcuate current-attenuating potentiometer winding 145 of which the right-hand end is indirectly coupled through lead 146 to the terminal 16. Winding 145 is divided into a highly conductive left-hand section 147 and a right-hand resistive current-attenuating section 148. A wiper 149 is normally disposed in stationary contact with section 147 but can be slid over that section and thence over resistive section 148 by the action of a motion-transmitting linkage 150 driven by the actuator 100. Wiper 149 is electrically coupled to the corona electrode wires 46 to operably develop between those wires and the attractor electrode bars 45 a variable ionizing field adapted in a controlled manner to supply energy to fluid flowing in the tube 41 so as to produce positive ions therein.

Since the electrical components of the discussed control system are all electrically referenced to terminal 16 which is in turn referenced to unit 110 to the high voltage line 11, it is necessary that all of such components be mounted in a manner to be well insulated from ground and to be energized from electrically floating power supplies.

The described equipment is adapted to interrupt the DC current from line 11 through load 12 when that load develops a short. For a better understanding of how the equipment effects that interruption, reference is now made to the simplified circuit diagram shown by FIG. 2.

In FIG. 2, the generator 10 of FIG. 1 is represented by a source G of a constant DC open circuit high voltage and by a resistor $R_G$ corresponding to the internal impedance of the generator. The switch 15 of FIG. 1 is represented by a resistor $R_S$. Since the load 12 is assumed to be a complete short, no element appears in FIG. 2 which corresponds to load 12. The FIG. 1 EGD installation 25 is represented by a box with its terminals 22 and 23 coupled to, respectively, the terminals 16 and 17 of switch 15.

Under short circuit conditions of the load 12 the current $I_1$ around the left-hand loop of the FIG. 2 circuit is given by the equation:

$$V_G = I_1(R_G + R_S) \quad (1)$$

Assuming that the EGD unit 25 is not in operation, the voltage across the switch 15 would be $V_S$ equal to $I_1 R_S$. As long as the switch is closed, $R_S$ is very small so that $V_S$ is commensurately small. When, however, the contacts of the switch are opened, the value of $R_S$ increases manyfold in an almost instantaneous manner to cause the voltage $V_S$ between the switch terminals to likewise increase to break down the intercontact gap and produce an arc between the switch contacts. Once that arc has started, it is sustained by a relatively small value of $V_S$ irrespective of the size of the gap between the contacts and, hence, cannot be extinguished by ordinary means.

Consider next the effect in the FIG. 2 circuit of the EGD unit 25. When in operation, that unit 25 is characterized by an internal current $I_2$ which is assumed as flowing as shown around the right-hand loop of the FIG. 2 circuit. In such circumstances, the voltage across the switch resistance $R_S$ is equal to $(I_1 - I_2)R_S$. Now, if the operation of the unit 25 is adjusted or controlled such that $I_2$ is equalized to $I_1$ while the switch contacts are relatively moving from a closed to a fully open position, no voltage during that period will be developed across switch 15 despite the change in value of the resistance $R_S$, wherefore no arc is produced across the switch contacts.

Once the switch has fully opened, the intercontact gap is large enough to withstand without breaking down the full voltage between line 11 and ground. Hence, after the switch is fully opened, the EGD unit 25 may be shut down to progressively attenuate to zero value the current $I_2$ therein. When that unit is shut down, it also is adapted to withstand the high voltage on line 11 by virtue of the fact that because the separation distance between the ionizing and collector electrode means of the EGD unit is greater than the separation distance between the contacts of the fully opened switch, the voltage gradient between those electrodes is much less than the voltage gradient between the switch contacts which, in turn, is insufficient to break down the gap between the switch contacts.

Accordingly, what the EGD unit ideally does in the FIG. 2 circuit is to sustain a flow of current which acts in the circuit to reduce to practically zero value the current through and the voltage across the main switch during opening thereof so as to permit the switch to be opened without development of an arc. In connection with such operation of the unit 25, two points of interest might be noted. First, since there is no current through switch 15, all of the current in the circuit flows around the outside thereof so that all of the current through generator 10 also passes through unit 25. Second, since there is no voltage between the switch terminals 16 and 17, there is likewise no voltage between the terminals 22 and 23 of the EGD unit 25. This means that the unit 25 is acting neither as a fluid propulsor consuming externally supplied electric power nor as a generator of electric power consumed externally of the unit, but, instead, is seen by the rest of the circuit as a lossless current conductor. While the ability of the EGD unit to so act as a lossless conductor might at first seem inconsistent with generally accepted electrical laws, such mode of operation is subject to the reasonable explanation that electrical losses do occur in the unit but are exactly balanced out by electrical energy gains derived from the mechanical energy of the moving fluid.

Coming now to various specific ways by which DC interruption with arc suppression can be effected by the FIG. 1 system, when load 12 shorts, actuator 100 is triggered either by pressing button 101 or in response to a trigger signal developed on lead 102 as a result of a sensing by unit 110 that the current through the main switch 15 has exceeded a threshold value set for that current. When actuator 100 has been triggered, it performs the following initial functions. First, it operates linkage 98 to cause opening as described of the valve means for tube 24 to create a supersonic flow of fluid through that tube. Second, actuator 100 through linkage 141 moves contact 138 to closure with contact 138 to develop across resistor 140 a voltage which is the sum of the output voltages of amplifier 135 and the power supply 136. Under those conditions an ionizing field determined by that combined voltage is developed between the electrodes 45 and 46 and a current $I_2$ starts to flow in tube 24 from the ionizing electrodes to the collector electrodes thereof.

The value of the $I_2$ current is controlled by the error signal developed on lead 115 by unit 110, so as to be equalized with the current $I_1$ (FIG. 1) to reduce to substantially zero the net current through the yet unopened switch 15. That is, if $I_2$ is initially less than $I_1$ to produce a net downward current $(I_1 - I_2)$ through the switch, the error signal reflects this fact by assuming a polarity indicative of that current direction and an amplitude indicative of the amount of net downward current, and the signal operates through bias circuit 120—123 amplifier 135, switch 137,138 and potentiometer 145 to increase the ionizing field so as to bring $I_2$ up to the value of $I_1$. In the reverse case where $I_2$ is initially greater than $I_1$, the error signal operates conversely to reduce the ionizing field so as to again equalize $I_2$ with $I_1$.

After $I_2$ and $I_1$ have so been equalized, the continued motion of actuator 100 operates through linkage 111 to open the movable contact 18 of main switch 15 relative to the fixed contact 19 thereof. Since, in the course of opening of that switch, the closed loop control of $I_2$ maintains $I_2$ equalized with $I_1$, no voltage is developed between the switch terminals and hence no arc can be struck in the gap between the opening switch contacts.

After main switch 15 has fully opened, continued motion of the actuator 100 operates through linkage 130 to shift movable contact 126 from the left-hand section 127 to the right-hand section 128 of fixed contact 124 so as, in effect, to eliminate from the circuits controlling the ionizing field the closed loop type of control provided by the mentioned error signal. At the same time, the actuator operates through linkage 150 to initiate a sliding of wiper 149 over the resistive section 148 of potentiometer winding 145 so as to produce a progressive reduction to zero value in the ionizing field between the electrodes 45 and 46. The result of such reduction in the ionizing field is that the current $I_2$ through tube 24 is progressively attenuated until it reaches zero, and the interruption of DC current from the line 11 to ground is complete. Thereafter, the equipment may be reset by first restoring the described valve means for tube 24 to closed position and by then returning the actuator 100 to the position it had before triggering so as to restore all the movable contacts and wipers of the control system back to their positions shown in FIG. 1.

To consider some variations on the mode of operation just described, in instances where the value of current $I_1$ can be predicted beforehand, and the current $I_2$ through tube 24 can be adjusted to the value of $I_1$ and maintained constant at that value by one or both of the expedients of adjusting the mass rate of flow of fluid through tube 41 and adjusting the value of the output voltage from supply 136, it is not necessary to control $I_2$ as a function of the error signal developed by unit 110. Instead, DC interruption without an arc can be effected by connecting the upper shown terminal of supply 136 directly to terminal 16 and by making the necessary one or more mentioned adjustments before a switch-opening operation so that, during such operation, $I_2$ will be $I_1$ while switch 15 is opening. In general, however, it is difficult to predict $I_1$ beforehand because load 12 may become shorted to a varying degree and because of reactance effects in the high voltage DC system. Also, lack of constancy in the mass rate of flow of fluid through tube 24 may result in lack of constancy of the current $I_2$. Hence, it is preferred for $I_2$ to be adjusted as a function of an error signal as earlier described.

Further, even when the value of $I_2$ is under error signal control, the successful suppression of arcing depends upon the ability of the control system to equalize $I_2$ to $I_1$ with good accuracy. That such accuracy required is evident from the expression $(I_1 - I_2)R_S$ for the voltage $V_S$ between the main switch terminals. Specifically, it is apparent from that expression that, when $R_S$ increases manyfold as a result of development of a gap between the switch contacts, even a small imbalance between $I_1$ and $I_2$ may be enough to produce a value of $V_S$ sufficient to strike an arc. On the other hand, it is not necessary that $I_2$ be exactly equalized with $I_1$ so long as the equalization is to a degree which reduces $V_S$ to a value at which is incapable of initiating an arc (or of sustaining an arc if one has already been struck).

As a first expedient for compensating for inequality between $I_2$ and $I_1$, a high voltage capacitor bank 160 may be connected in parallel with the main switch 15. As is well known, the effect of device 160 is to minimize the voltage which can be developed across the switch as its contacts are opening. Because the voltage across the switch is $(I_1 - I_2)R_S$ rather than the much larger value of $I_1 R_S$ which would be produced if EGD unit 25 were not present, device 160 may be of much smaller capacitance than if that device 160 alone were relied upon to effect arc suppression.

Also, need for close equalization of $I_1$ and $I_2$ can be avoided by adapting a mode of operation in which an arc is allowed to momentarily develop but is then extinguished. In such mode, the wiper 124 is set on winding 123 so as to add to the error signal a bias signal causing the initial value of $I_2$ to be deliberately in excess of whatever value of $I_1$ is produced upon shorting of load 12. It follows that when the EGD installation 25 is in operation to conduct the current $I_2$ but the main switch 15 has not yet opened, a net current $(I_1 - I_2)$ will be produced through the switch in the upward or reverse direction. In such circumstances an arc may well develop in the course of opening of the switch. During or after the switch has opened, however, the current $I_2$ is progressively attenuated as described, and, in the course of such attenuation, $I_2$ necessarily becomes transiently equal to $I_1$ and then drops in value below $I_1$. Accordingly, there is necessarily a period in which the voltage between the switch contacts becomes insufficient to sustain any arc developed, wherefore such arc will be extinguished and cannot be reestablished if at that time (a) the rate of opening of the gap between the switch contacts is faster than the rate of increase of voltage between those contacts, or (b) the gap is already so large as to withstand the full voltage between line 11 and ground.

With the mode of operation just described wherein $I_2$ is initially made greater than $I_1$ but progressively drops to and below the value of $I_1$, it is not necessary for $I_2$ to be adjusted as a function of the error signal. Instead, the technique can be employed of providing for an initial value of $I_2$ greater than any value of $I_1$ so that, during or after the opening of the main switch, $I_2$ transiently equalizes with and then becomes lesser than $I_1$, to suppress a developed arc as described. In the event, the supply of fluid for tube 41 is relatively large so as to yield a relatively constant mass rate of flow of fluid through the tube, the attenuation of $I_2$ is effected by the discussed action of potentiometer 145. In the event, however, the fluid supply is small so that the mass rate of flow of fluid through the tube progressively diminishes, the described attenuation of $I_2$ may be effected by a combination of the action of potentiometer 145 and the falling off of $I_2$ caused by such diminishment or by, alone, such progressive decrease in the mass flow rate of the fluid.

Equipments of the sort described may also be used to effect arc suppression in the instance where the load is not shorted but it is desired to remove the load from the high voltage DC circuit. For such application the current $I_1$ through the switch is limited by the impedance of the load, wherefore the EGD installation necessary to conduct a current $I_2$ of the order of $I_1$ may be substantially smaller in size than in the case where the load is shorted.

It should also be pointed out that the current $i_2$ through the EGD unit 25 need not be produced by positive ions. Instead, (a) the attractor electrodes 45 and collector electrodes 55 may be connected to, respectively, the terminals 23 and 22, (b) the power supplies for corona electrodes 46 may be modified to produce on those electrodes a voltage which is negative relative to the attractor electrodes, and which accordingly generates ions of negative polarity in the fluid flowing through tube 24, (c) corresponding obvious modifications may be made in the system for changing the voltage on the corona electrodes as a function of the described error signal such that a change in such voltage is in a direction to reduce the error signal in the instance where negative ions are being generated. By so modifying the EGD installation, the current $I_2$ will be produced by flow through tube 24 of negative ions.

The above-described embodiments being exemplary only, it is to be understood that additions thereto, modifications thereof and omissions therefrom can be made without departing from the spirit of the invention, and that, therefore, the invention comprehends embodiments differing in form and/or detail from those specifically disclosed. Accordingly, the invention is not to be considered as limited save as is consonant with the recitals of the following claims.

I claim:

1. In apparatus operably supplied with high voltage DC current from DC current source means and comprised of load means for such current and of circuit breaking switch means serially coupled in circuit with said load means and source means and adapted on being closed and open to conduct and to interrupt, respectively, a flow of such current through said load means and between first and second terminal means for said switch means, the improvement comprising, fluid flow guide means definitive of a flow path for an ionizable fluid, ionizing electrode means and collector electrode means disposed at respective locations along said path which are relatively upstream and downstream, respectively, said ionizing electrode means and collector electrode means being respectively operable to generate ions in a flow of fluid in said path and to neutralize ones of said ions downstream of their zone of generation, said guide means and two electrode means being components of an electrogasdynamic channel means providing for conduction of current by the ionized flowing fluid between said two electrode means, and means coupling said two electrode means in circuit with said switch means so as to provide for conduction by said channel means of current between said two terminal means in the course of an opening of said switch means.

2. The improvement as in claim 1 in which said switch means is comprised of first and second contact means which are selectively closable together and openable from each other, and in which said ionizing electrode means and collector electrode means are respectively coupled in circuit with one and the other of said first and second contact means so as to render the ionized fluid current path between said two electrode means both in parallel with the current path through said switch means and in series with said load means.

3. The improvement as in claim 2 further comprising, selectively triggerable control means operably coupled with said switch means and channel means and responsive to triggering thereof both to actuate said channel means to conduct current and to open said two contact means after current conduction has been established in said channel means.

4. The improvement as in claim 3 in which said control means is manually triggerable.

5. The improvement as in claim 3 further comprising sensing means responsive to current above a threshold value through said switch means to produce a signal by which said control means is triggerable.

6. The improvement as in claim 3 further comprising valve means for controlling the flow of fluid through said channel means, said valve means being operably coupled with said control means to be opened thereby in response to triggering of said control means so as to initiate a flow of fluid through said channel means.

7. The improvement as in claim 6 in which said valve means is at the downstream end of said channel means.

8. The improvement as in claim 3 in which said ionizing electrode means is comprised of attractor electrode means and of collector electrode means adapted to generate said ions in the presence of an ionizing electric field between such two electrode means, said improvement further comprising means actuated by said control means to establish said field upon triggering of said control means.

9. The improvement as in claim 3 further comprising means to attenuate the current through said channel means after said two contact means have opened.

10. The improvement as in claim 6 in which said control means actuates said current attenuating means so as to provide said attenuating action.

11. The improvement as in claim 10 in which said ionizing electrode means comprises attractor electrode means and corona electrode means operably sustaining therebetween an ionizing electric field, and in which said current attenuating means is comprised of means actuated by said control means to progressively diminish the intensity of said field after said two contact means have opened.

12. The improvement as in claim 9 in which said current attenuating means is comprised of fluid supply means disposed in fluid coupled relation with the upstream end of said channel means to provide a limited quantity of said fluid for flow thereof through said channel means, said supply means operably producing attenuation of current through said channel means by virtue of providing a progressively diminishing mass rate of flow of such fluid through said channel means.

13. The improvement as in claim 2 further comprising capacitance means electrically coupled between said first and second contact means to inhibit an increase in voltage between said two contact means upon opening thereof.

14. The improvement as in claim 1 further comprising means responsive to current through said switch means to produce a signal reflecting the amount of such current, and means responsive to said signal to control the amount of current conduction in said channel means so as to tend to reduce to zero the net current passing through said switch means in the course of an opening thereof.

15. The improvement as in claim 1 further comprising a plurality of electrically floating dielectrically coated wire electrodes disposed in said flow path between such ionizing electrode means and collector electrode means to diminish the intensity of the space charge field produced in said path by said ions.

16. The improvement as in claim 15 in which said floating electrodes are respectively comprised of a plurality of electrically floating gridworks of dielectrically coated wire, said gridworks being disposed in said path transversely of the direction of fluid flow therein and being spaced from each other in said direction along said path between said ionizing electrode means and said collector electrode means.

17. The method of interrupting generator-supplied direct current passing in a first direction through a switch comprising, applying to said switch before opening thereof a bucking current flowing through said switch in a direction opposite to the direction of flow therethrough of said generator-supplied current, opening said switch, and controlling said bucking current to equalize such current with said generator-supplied current at at least after said switch has opened so as to reduce the voltage across the opened switch to a value incapable of sustaining an arc across such opened switch, said bucking current being equalized with said generator-supplied current by applying to said switch a bucking current greater than said generator-supplied current before said switch is opened and by subsequently attenuating said bucking current to become in a period after said switch has opened of a value which is equal to and then less than said generator-supplied current.